Dec. 7, 1926.
F. J. McLAUGHLIN ET AL
COMBINATION TOOL
Filed Sept. 12, 1923
1,609,732
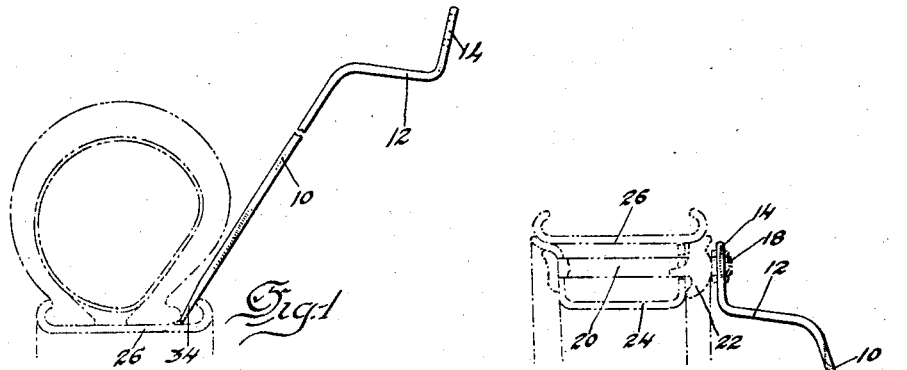
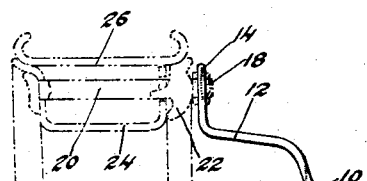
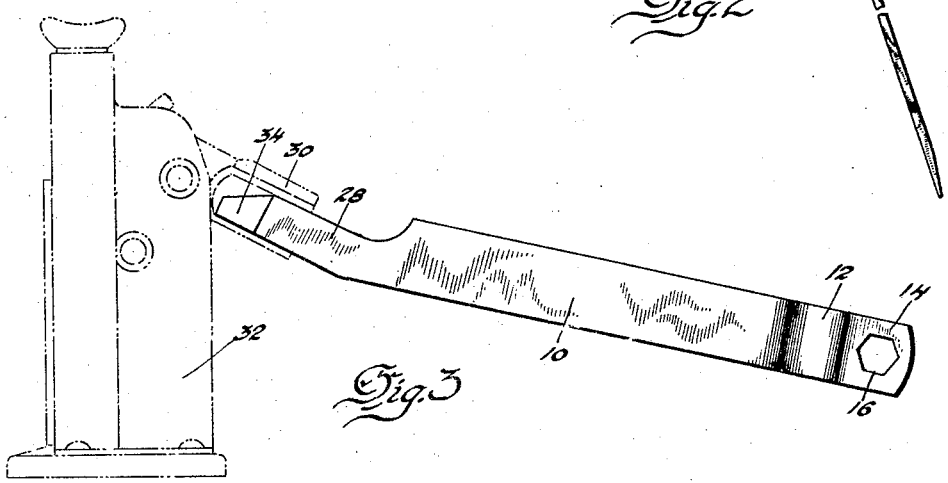
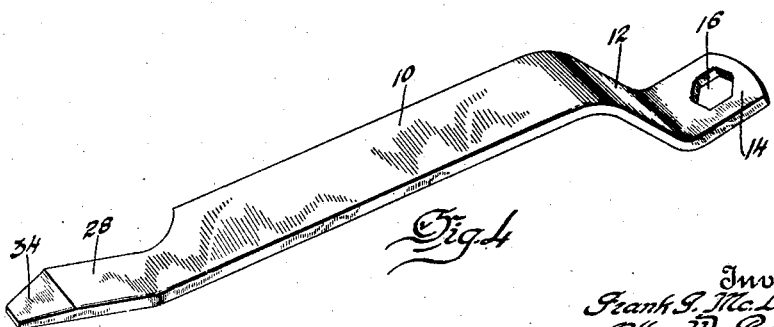
Inventors
Frank J. McLaughlin
Allan W. Reader
By their Attorneys Harry R. McMahon
Blackmore, Spencer & Flint.

Patented Dec. 7, 1926.

1,609,732

UNITED STATES PATENT OFFICE.

FRANK J. McLAUGHLIN, OF DETROIT, ALLAN W. READER, OF FERNDALE, MICHIGAN, AND HARRY R. McMAHON, OF SEWICKLEY, PENNSYLVANIA; SAID McLAUGHLIN AND SAID READER ASSIGNORS TO GENERAL MOTORS CORPORATION, OF DETROIT, MICHIGAN, A CORPORATION OF DELAWARE.

COMBINATION TOOL.

Application filed September 12, 1923. Serial No. 662,233.

This invention relates to combination tools for use in connection with automobiles, and is illustrated as embodied in a single tool designed to be used either as the removable handle of a jack or in removing a tire from a demountable rim.

As is well known, it is common practice with motorists to use the removable handle of a jack as a tool for use in removing demountable rims and in removing tires from their rims, but such use is more or less difficult due to the fact that the handle is usually merely a straight flat bar of metal which is not very well adapted for any use other than as a handle.

According to the present invention, the handle is specially constructed to fit it for use in manipulating the tire, and, if desired, for use as a socket wrench in removing and replacing a demountable rim, without sacrificing in any way its utility as a readily removable handle for the jack.

In the embodiment illustrated in the drawings, the removable handle is in the form of a bar having one end offset, as, for example, by being reduced in width to form a portion at an obtuse angle to the main part of the bar, which portion is adapted to fit in the socket of the operating handle of the jack and which is also thinned down or beveled to form a prying portion which can be inserted under a tire on a rim. If the handle is also to be used as a wrench, the opposite end of the bar may be bent down to form a parallel offset portion perforated to fit over the rim nuts.

The above and other objects and features of the invention, including various desirable particular constructions, will be apparent from the following description of one illustrative embodiment of the invention shown in the accompanying drawings, in which—

Fig. 1 is a section through a rim and tire showing the improved combination tool used to pry the tire off the rim;

Fig. 2 is a section through a rim and felly showing the improved combination tool used as a socket wrench to remove or replace the rim nut;

Fig. 3 is a side elevation showing the improved combination tool used as a removable handle for a jack; and Fig. 4 is a perspective of the combination tool.

In the form shown in the drawings, the tool is in the form of a flat bar 10 of metal, which may have one end bent down at 12 and again bent to form a portion 14 generally parallel to the main part of the bar and perforated at 16 to form a socket wrench to be used in removing or replacing rim nuts such as shown at 18 in Fig. 2. These rim nuts are commonly used to draw up rim bolts 20 to force a wedge lug 22 against a felly 24 to hold a demountable rim 26. This wrench socket preferably also fits the usual retaining nut threaded on the valve stem.

According to the present invention, the opposite end of the bar is reduced in width, as shown at 28, to form an angularly offset portion constructed and arranged to fit in the usual socket in the operating handle 30 of a jack 32. This portion is also thinned down or beveled at 34 to adapt it for use, as shown in Fig. 1, in being forced under a tire to pry it off the demountable rim, and also for use, if desired, in prying apart the ends of a split demountable rim. The tool is also adapted for use, if desired, in removing the screw which fastens the ends of the rim together and which reduced end also adapts it to enter more readily the jack-handle socket.

By the above described construction a single tool is especially fitted for any one of a number of uses, in such a manner that in fitting it for one of these uses it does not in any way detract from its adaptation for one of the other uses; that is to say, thinning the tool down for use in removing a tire does not make it any less well adapted for use as a jack handle, and the manner of fitting it for use as a jack handle not only does not interfere with use of the tool as a wrench, but provides an angularly offset portion especially well adapted for use as a wrench handle.

While one illustrative embodiment of our invention has been described, it is not our intention to limit its scope to that embodiment or otherwise than by the terms of the appended claim.

We claim:

A combination tool comprising a bar having a flat intermediate portion merging into an end portion offset therefrom angularly in the same plane as said intermediate portion and reduced in width to fit in the socket of the operating handle of a jack, said end portion being thinned down to less thickness, measured at right angles to said plane, than said intermediate portion to adapt it for use in prying off a tire.

In testimony whereof we affix our signatures.

FRANK J. McLAUGHLIN.
ALLAN W. READER.
HARRY R. McMAHON.